(12) United States Patent
Chapman et al.

(10) Patent No.: US 11,954,132 B2
(45) Date of Patent: Apr. 9, 2024

(54) TEXT MINING ELECTRONIC DOCUMENTS TO CLASSIFY A MAINTENANCE RECORD FOR A MACHINE

(71) Applicant: The Boeing Company, Chicago, IL (US)

(72) Inventors: Steven D. Chapman, Chesterfield, MO (US); Peter Lake, Seattle, WA (US)

(73) Assignee: The Boeing Company, Arlington, VA (US)

( * ) Notice: Subject to any disclaimer, the term of this patent is extended or adjusted under 35 U.S.C. 154(b) by 259 days.

(21) Appl. No.: 17/666,152

(22) Filed: Feb. 7, 2022

(65) Prior Publication Data

US 2022/0350821 A1 Nov. 3, 2022

Related U.S. Application Data

(60) Provisional application No. 63/180,916, filed on Apr. 28, 2021.

(51) Int. Cl.
| | |
|---|---|
| *G06F 16/00* | (2019.01) |
| *G06F 16/22* | (2019.01) |
| *G06F 16/28* | (2019.01) |
| *G06Q 10/20* | (2023.01) |

(52) U.S. Cl.
CPC ............ *G06F 16/285* (2019.01); *G06F 16/22* (2019.01); *G06Q 10/20* (2013.01)

(58) Field of Classification Search
CPC ................................ G06F 16/285; G06F 16/22
USPC ........................................................ 707/738
See application file for complete search history.

(56) References Cited

U.S. PATENT DOCUMENTS

| | | | |
|---|---|---|---|
| 8,620,936 B2 | 12/2013 | Lake et al. | |
| 8,825,276 B2 | 9/2014 | Lake et al. | |
| 11,195,343 B2 | 12/2021 | Lake et al. | |
| 2020/0269995 A1* | 8/2020 | Beaven | G07C 5/008 |
| | | | 707/707 |

OTHER PUBLICATIONS

Andrei, A.G., "Building a blockchain for aviation maintenance records," Journal of Physics: Conference Series 1781:012067. (Year: 2021).*

(Continued)

*Primary Examiner* — Alexandria Y Bromell
(74) *Attorney, Agent, or Firm* — Alleman Hall & Tuttle LLP

(57) ABSTRACT

A method is provided for classifying a maintenance record for a machine. The method includes receiving the maintenance record including maintenance event information expressed as a collection of terms of interest, and normalizing the terms of interest to their non-abbreviated, dictionary form. The method includes accessing a database of authoritative engineering information from electronic documents, expressed textually and indexed by class of a plurality of classes. The method includes weighted scoring the authoritative engineering information that uses one or more of the terms of interest represented in the weighted scoring by uniqueness scores. Matching authoritative engineering information is determined for the maintenance event information based on the weighted scoring, and the maintenance record is labeled with the class to which the matching authoritative engineering information is indexed.

20 Claims, 5 Drawing Sheets

(56) References Cited

OTHER PUBLICATIONS

Niraula, Nobal B., "HPart and Condition Extraction from Aircraft Maintenance Records," 2020 IEEE International Conference on Prognostics and Health Management. (Year: 2020).*

Cheng, Hao., "Analysis and Improvement of Aircraft Structural Maintenance Records," ICASIT 2020: Proceedings of the 2020 International Conference on Aviation Safety and Information Technology. (Year: 2020).*

* cited by examiner

TEXT MINING ELECTRONIC DOCUMENTS TO CLASSIFY A MAINTENANCE RECORD FOR A MACHINE

CROSS-REFERENCE TO RELATED APPLICATION(S)

This application claims priority of U.S. Provisional Patent Application No. 63/180,916, filed Apr. 28, 2021, entitled Text Mining Electronic Documents to Classify aa Maintenance Record for a Machine, the content of which is incorporated herein in its entirety by reference.

TECHNOLOGICAL FIELD

The subject disclosure relates generally to data mining and, in particular, to text mining electronic documents to classify a maintenance record for a machine.

BACKGROUND

Data mining broadly seeks to expose patterns and trends in data, and most data mining techniques are sophisticated methods for analyzing relationships among highly formatted data, such as numerical data or data with a relatively small fixed number of possible values. However, a vast amount of information consists of textually-expressed information, including many database fields, reports, memos, e-mail, web pages, product descriptions, social media, and external news articles of interest to managers, market analysts, and researchers.

Text mining is an extension of the general notion of data mining in the area of free or semi-structured text. In comparison to data mining, text data analysis (also referred to as "text mining" or simply "text analysis") refers to the analysis of text, and may involve such functions as text summarization, text visualization, document classification, document clustering, document summarization, and document cross-referencing. Thus, text data analysis may help a knowledge worker find relationships between individual unstructured or semi-structured text documents and semantic patterns across large collections of such documents.

Research in the area of text mining has its roots in information retrieval, which began around 1960, when researchers started to systematically explore methods to match user queries to documents in a database. However, recent advances in computer storage capacity and processing power, coupled with massive increases in the amount of text available on-line, have resulted in a new emphasis on applying techniques learned from information retrieval to a wider range of text mining problems. Generally speaking, text mining requires the ability to automatically assess and characterize the similarity between two or more sources of text.

In general, text mining depends on the twin concepts of "document" and "term." As used in this disclosure, a "document" refers to a body of free or semi-structured text. The text can include the entire content of a document in its general sense, such as a book, an article, a paper, a data record or the like, or a portion of a traditional document, such as an abstract, a paragraph, a sentence, or a phrase, for example, a title. Ideally, a document describes a coherent topic. In addition, a document can encompass text generated from an image or other graphics, as well as text recovered from audio or video formats.

On the other hand, a document can be represented as collections of "terms," each of which can appear in multiple documents. In some cases, a term can consist of an individual word used in the text. However, a term can also include multiple words that are commonly used together, for example, the part name "landing gear." This type of term is at times referred to as a "multiword term."

By way of example, the airline industry relies upon data records entered by personnel in support of their engineering activities and engineering activities of industrial robots during pre-production, production and post-production of an aircraft or other manufactured product. In a more particular example, mechanics create data records relating to the results of inspections, repairs that have been undertaken, and the like.

The administration of a number of programs often rely on classification of text data. This is the case for a number of maintenance cost guarantee (MCG) programs in which an aircraft manufacturer may exclude certain maintenance costs such as those related to the engine original equipment manufacturer (OEM). The administration of these programs relies on the classification of maintenance records according to Air Transport Association (ATA) standards, but airlines often report maintenance events in records that are not sufficiently classified. Existing solutions rely on machine learning algorithms to classify maintenance records by ATA standards, but these solutions require significant time and computing system resources to train the machine learning algorithms.

It would therefore be desirable to have a system and method that takes into account at least some of the issues discussed above, as well as other possible issues.

BRIEF SUMMARY

Example implementations of the subject disclosure are directed to data mining and, in particular, to text mining electronic documents to classify a maintenance record for a machine such as an aircraft. Example implementations classify the maintenance record without machine learning, and address and overcome technical challenges associated with classification of the maintenance record in less time and with fewer resources than typically required for machine learning. Example implementations normalize maintenance event information in the maintenance record, weighted score terms of interest in the maintenance event information, and then use the weighted score to classify the maintenance record.

The subject disclosure thus includes, without limitation, the following example implementations.

Some example implementations provide a method of classifying a maintenance record for a machine, the method comprising receiving the maintenance record including maintenance event information expressed as a collection of terms of interest in engineering jargon related to the machine, at least some of the engineering jargon abbreviated in maintenance record; normalizing the terms of interest to their non-abbreviated, dictionary form; accessing a database of authoritative engineering information from electronic documents, the authoritative engineering information expressed textually and indexed by class of a plurality of classes; weighted scoring the authoritative engineering information that uses one or more of the terms of interest represented in the weighted scoring by uniqueness scores inversely related to frequency of the terms of interest across the plurality of classes to which the authoritative engineering information is indexed; determining matching authoritative engineering information for the maintenance event information based on the weighted scoring; and labeling the maintenance record with the class to which the matching authoritative engineering information is indexed, and thereby classifying the maintenance record into the class.

Some example implementations provide an apparatus for classifying a maintenance record for a machine, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for classifying a maintenance record for a machine, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the subject disclosure will be apparent from a reading of the following detailed description together with the accompanying figures, which are briefly described below. The subject disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
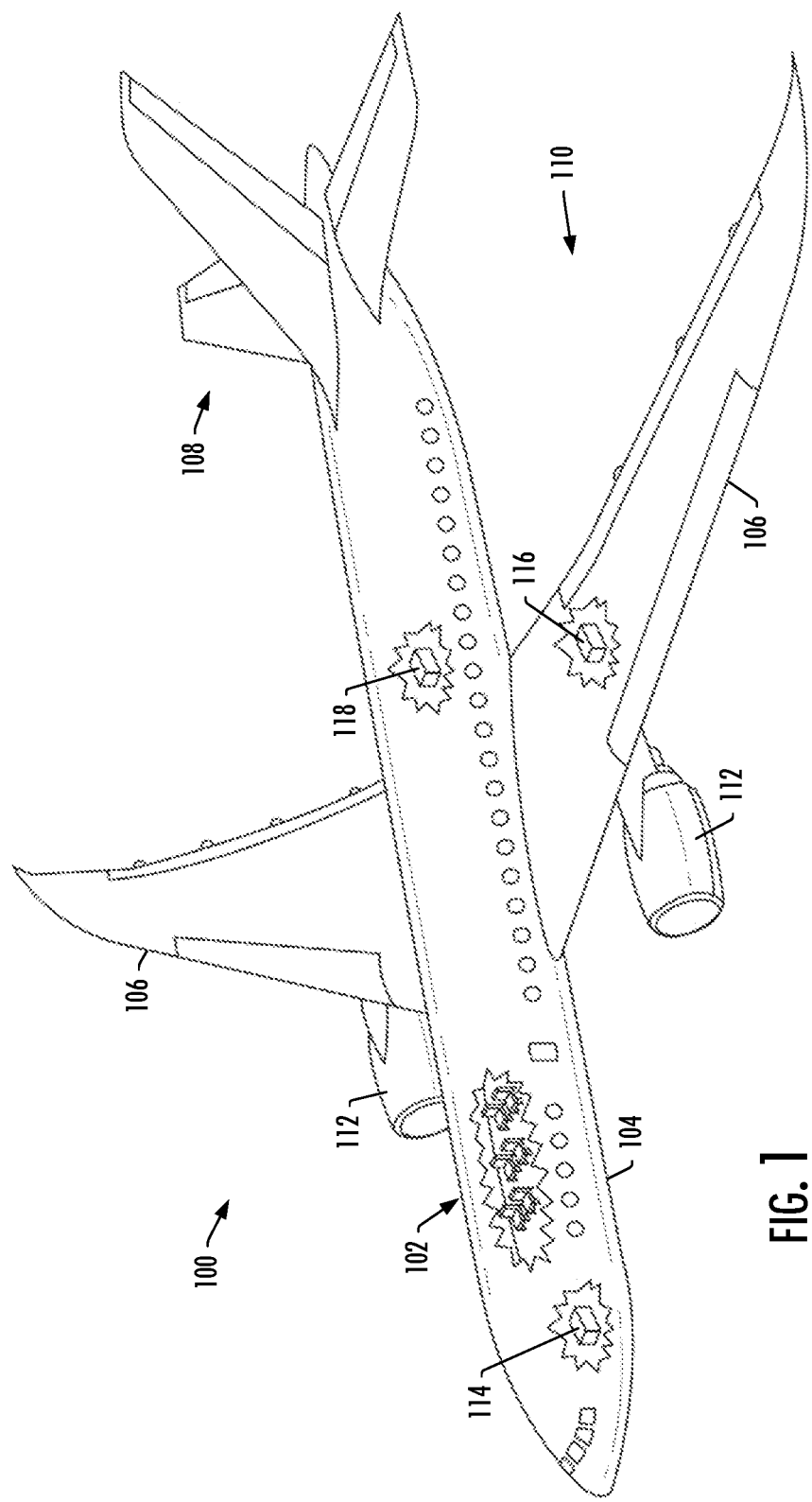
FIG. 1 illustrates an aircraft that may benefit from example implementations of the subject disclosure.

Some implementations of the subject disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably. To the extent that terms "includes," "including," "has," "contains," and variants thereof are used herein, such terms are intended to be inclusive in a manner similar to the term "comprises" as an open transition word without precluding any additional or other elements.

Example implementations of the subject disclosure are directed to data mining and, in particular, to text mining electronic documents to classify a maintenance record for a machine such as an aircraft. In this regard, FIG. 1 illustrates one type of aircraft 100 that may benefit from example implementations of the subject disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems can also include an electrical system 114, hydraulic system 116 and/or environmental system 118. Any number of other systems can be included.

As explained above, the administration of a number of programs, such as those in the airline industry, rely on text mining and in particular classification of text data such as maintenance records. Existing solutions rely on machine learning algorithms, but these solutions require significant time and computing system resources to train the machine learning algorithms. Example implementations address and overcome technical challenges with classification of a maintenance record in less time and with fewer resources than typically required for machine learning. Example implementations normalize maintenance event information in the maintenance record, weighted score terms of interest in the maintenance event information, and then use the weighted score to classify the maintenance record.

Figure 2:
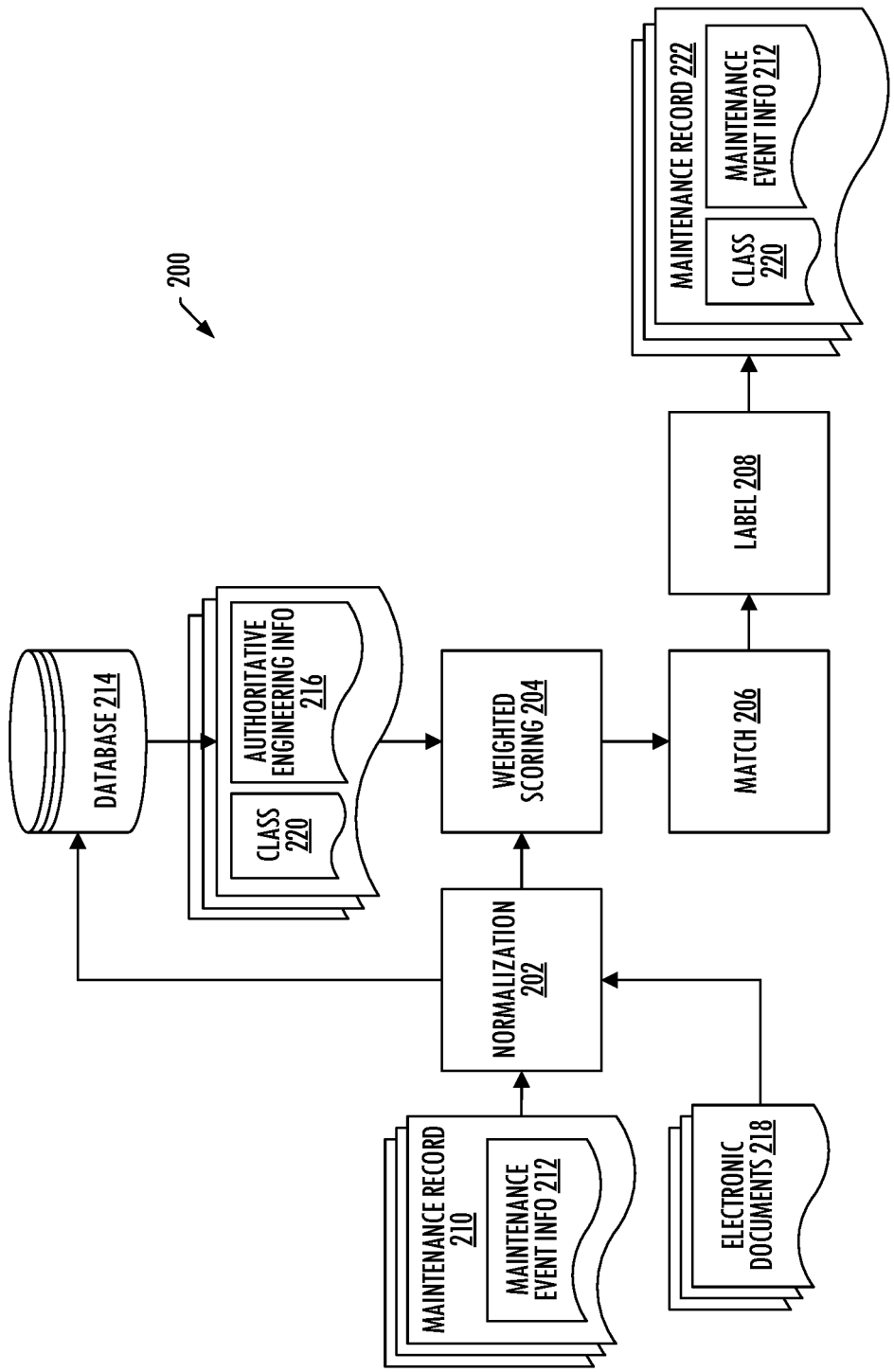
FIG. 2 illustrates a system for classifying a maintenance record for a machine such as an aircraft, according to various example implementations.

FIG. 2 illustrates a system 200 for classifying a maintenance record for a machine such as the aircraft 100 shown in FIG. 1, according to some example implementations of the subject disclosure. The system 200 can include any of a number of different subsystems (each an individual system, and each at times referred to as a component) for performing one or more functions or operations. One or more of the subsystems can be co-located or directly coupled to one another, or in some examples, various ones of the subsystems can communicate with one another across one or more computer networks. Although shown as part of the system, it should be understood that any one or more of the subsystems can function or operate as a separate system without regard to any of the other subsystems. It should also be understood that the systems can include one or more additional or alternative subsystems than those shown in the figures.

As shown, the system 200 includes a normalization component 202, a weighted score component 204, a match component 206, and a label component 208. The normalization component is generally configured to receive the maintenance record 210 including maintenance event information 212 expressed as a collection of terms of interest in engineering jargon related to the machine, where at least some of the engineering jargon is abbreviated in maintenance record. The normalization component, then, is configured to normalize the terms of interest to their non-abbreviated, dictionary form. Examples of techniques that can be leveraged by the normalization component are described in U.S. Pat. No. 8,620,936, issued to The Boeing Company on Dec. 31, 2013, and U.S. Pat. No. 8,825,276, issued to The Boeing Company on Sep. 2, 2014, the contents of both of which are hereby incorporated by reference.

The weighted score component 204 is generally configured to access a database 214 of authoritative engineering information 216 from electronic documents 218. The authoritative engineering information is expressed textually and indexed by class 220 of a plurality of classes. In some examples, classes of the plurality of classes are numbers in a numbering system that is a common referencing standard for the electronic documents. In some further examples in which the machine is an aircraft, the numbers are Air Transport Association (ATA) numbers in an ATA numbering system such as described by the ATA 100. In this numbering system, the ALA number is expressed in a chapter format such as CC, and can further include a section SS such that the ATA number can be formatted CC-SS. In particular, for example, ATA 52 is used in the ATA numbering system to refer to documentation related to the doors of a commercial aircraft.

The electronic documents 218 can include design documents such as, for example, engineering diagrams, technical drawings (e.g., OEM drawings), wiring diagrams and the like. These documents can also include maintenance documents and/or operations documents (either generally referred to as a "maintenance document"). Examples of suitable aircraft maintenance documents include an aircraft illustrated parts catalog (AIPC), aircraft flight manual (AFM), aircraft maintenance manual (AMM), aircraft recovery manual (ARM), airworthiness directive (AD), component maintenance manual (CMM), component maintenance manual parts list (CMMIPL), configuration change support data (CCSD), configuration deviation list (CDL), consumable products manual (CPM), engine (shop) manual (EM), engineering drawings (ED), equipment list (EL), dispatch deviation guide (DDG), engine cleaning inspection and repair manual (CIR), engine illustrated parts catalog (EIPC), engine parts configuration management section (EPCM), fault repair manual (FRM), fault reporting and fault isolation manual (FRM/FIM), flight crew operations manual (FCOM), general maintenance manual (GMM), illustrated tool and equipment manual (ITEM), in-service activity report (ISAR), maintenance planning document (MPD), maintenance review board report (MRB), maintenance synoptics, maintenance tips (MT), maintenance training manual (MTM), master minimum equipment list (MMEL), non-destructive testing manual (NDT), power plant build-up manual (PPBM), power plant build-up manual illustrated parts list (PPBMIPL), production management database (PMDB), service bulletin (SB), service bulletin index (SBI), service letter (SL), structural repair manual (SRM), systems description section (SDS), system schematics manual (SSM), task card, tool and equipment manual (TEM), weight and balance manual (WBM), wiring diagram manual (WDM) and the like.

In some examples, the normalization component 202 is further configured to access the electronic documents 218 in which the authoritative engineering information 216 is expressed textually in the engineering jargon, where at least some of the engineering jargon is abbreviated in the authoritative engineering information. In some of these examples, the normalization component is configured to normalize the authoritative engineering information to its non-abbreviated, dictionary form. The normalization component, then, is configured to store the authoritative engineering information as normalized in the database 214.

The weighted score component 204 is configured to weighted score the authoritative engineering information 216 that uses one or more of the terms of interest represented in the weighted scoring by uniqueness scores inversely related to frequency of the terms of interest across the plurality of classes to which the authoritative engineering information is indexed.

In some examples, the weighted score component 204 is configured to assign the uniqueness scores to the terms of interest in which higher ones of the uniqueness scores are assigned to those of the terms of interest used less frequently across the plurality of classes. In some of these examples, the weighted score component is configured to determine weights of the electronic documents 218 based on a number of the terms of interest used in respective ones of the electronic documents, and a maximum number of the terms of interest used in any one of the electronic documents, such as according to a non-linear growth function such as a logarithmic growth function. The weighted score component is then configured to determine weighted scores for the authoritative engineering information from the uniqueness scores and the weights.

In a more particular example for a particular electronic document 218, let x represent the number of the terms of interest used in the particular electronic document, and let y represent the maximum number of the terms of interest used in any one of the electronic documents. The weight z of the particular electronic document, then, can be determined according to a logarithmic growth function as follows: $z=\ln(x+1)/\ln(y+1)$. The weight of any of the electronic documents can be greater than zero, and up to a maximum of 1.0 for the one of the electronic documents with the maximum number of terms of interest (i.e., x=y).

In some examples, the weighted scores include a weighted score for each item of authoritative engineering information 216 in each electronic document 218. In some of these examples, weighted score component 204 is configured to determine a sum of the uniqueness scores of those of the terms of interest used in the item of authoritative engineering information, and adjust the sum by the weight of the electronic document to thereby determine the weighted score. Examples of techniques that can be leveraged by the weighted score component are described in US 2020/0380794 to The Boeing Company, published on Dec. 3, 2020, the content of which is hereby incorporated by reference.

The match component 206 is generally configured to determine matching authoritative engineering information 216 for the maintenance event information 212 based on the weighted scoring from the weighted score component 204. And the label component 208 is generally configured to label the maintenance record 210 with the class 220 to which the matching authoritative engineering information is indexed, and thereby classify the maintenance record into the class. This results in a labeled maintenance record 222 including the maintenance event information, and the class to which the maintenance record is classified. The labeled maintenance record can then be output such as for display, further processing or the like.

In some examples, the system 200 is configured to operate over a plurality of maintenance records 210 including respective maintenance event information 212. In some of these examples, then, maintenance records of the plurality of maintenance records are labeled with those of the plurality of classes 220 to which respective matching authoritative engineering information 216 is indexed.

In some examples, classes of the plurality of classes 220 are numbers in a numbering system that is a common referencing standard for the electronic documents 218. In some examples, the authoritative engineering information 216 is indexed by number of the numbers, and the maintenance record 210 is labeled with the number to which the matching authoritative engineering information is indexed. And in some further examples in which the machine is an aircraft such as aircraft 100, the numbers are ATA numbers in an ATA numbering system.

In some examples, the system 200 is configured to display one or more maintenance records 210. Additionally or alternatively, in some examples, the system is configured to store a plurality of maintenance records as labeled in a database. The system or another system, then, can be configured to execute a database query for features of the plurality of maintenance records from the database using the labels for data analytics performed thereon. In some examples, this includes a search of the database for those of the plurality of maintenance records that are classified in one or more classes of interest, which may be then used in administration of one or more programs as described above.

To further illustrate at least some example implementations of the subject disclosure, consider the case of a maintenance record including the following maintenance event information: "CLN—PAX ENTRY DR GIRT BAR FLT FTGS." The normalization component 202 can be configured to normalize the terms of interest to their non-abbreviated, dictionary form, such as to the following: "CLEAN PASSENGER ENTRY DOOR GIRT BAR FLIGHT FITTINGS."

The weighted score component 204 can be configured to weighted score authoritative engineering information 216 such as an AMM task card that uses one or more of the terms of interest of the maintenance event information. In the weighted scoring, the terms of interest represented in the weighted scoring by uniqueness scores inversely related to frequency of the terms of interest across the plurality of classes to which the authoritative engineering information is indexed. In particular, the terms of interest can be weighted by uniqueness scores such as GIRT (50), BAR (15), ENTRY (10). In this regard, the term "GIRT" can be used only with respect to the ATA number for doors (ATA 52); and accordingly, the term can be given a higher value than terms (e.g., nut, bolt) found under multiple ATAs. This recognizes that maintenance event information that uses the term GIRT has a higher probability of being found under ATA 52 relative to other ATA numbers.

The match component 206 can be configured to determine matching authoritative engineering information 216 for the maintenance event information 212 based on the weighted scoring from the weighted score component 204. In this regard, the match component can compare the maintenance event information to the authoritative engineering information to identify the highest-scoring item of authoritative engineering information, such as based on the uniqueness scores, and weights of the electronic documents 218 including the AMM task card, and according to a non-linear growth function such as a logarithmic growth function (more "unique" terms, number of matches and natural log distribution). In this example, the highest scoring item from the authoritative engineering information can be for the AMM task card: "RESTORE PASSENGER ENTRY DOOR FWD AND AFT GIRT BAR FLOOR FITTINGS," which is indexed to ATA number 52-1. The label component 208 can be configured to label the maintenance record 210 with that ATA number.

FIGS. 3A-3D are flowcharts illustrating various steps in a method 300 of classifying a maintenance record for a machine, according to various example implementations of the subject disclosure. The method includes receiving the maintenance record including maintenance event information expressed as a collection of terms of interest in engineering jargon related to the machine, at least some of the engineering jargon abbreviated in maintenance record, as shown at block 302 of FIG. 3A. The method includes normalizing the terms of interest to their non-abbreviated, dictionary form, as shown at block 304.

The method 300 includes accessing a database of authoritative engineering information from electronic documents, as shown at block 306. In some examples, the authoritative engineering information is expressed textually and indexed by class of a plurality of classes. The method includes weighted scoring the authoritative engineering information that uses one or more of the terms of interest, as shown at block 308. In this regard, the one or more of the terms of interest are represented in the weighted scoring by uniqueness scores inversely related to frequency of the terms of interest across the plurality of classes to which the authoritative engineering information is indexed. The method includes determining matching authoritative engineering information for the maintenance event information based on the weighted scoring, as shown at block 310. And the method includes labeling the maintenance record with the class to which the matching authoritative engineering information is indexed, and thereby classifying the maintenance record into the class, as shown at block 312.

Figure 3A:
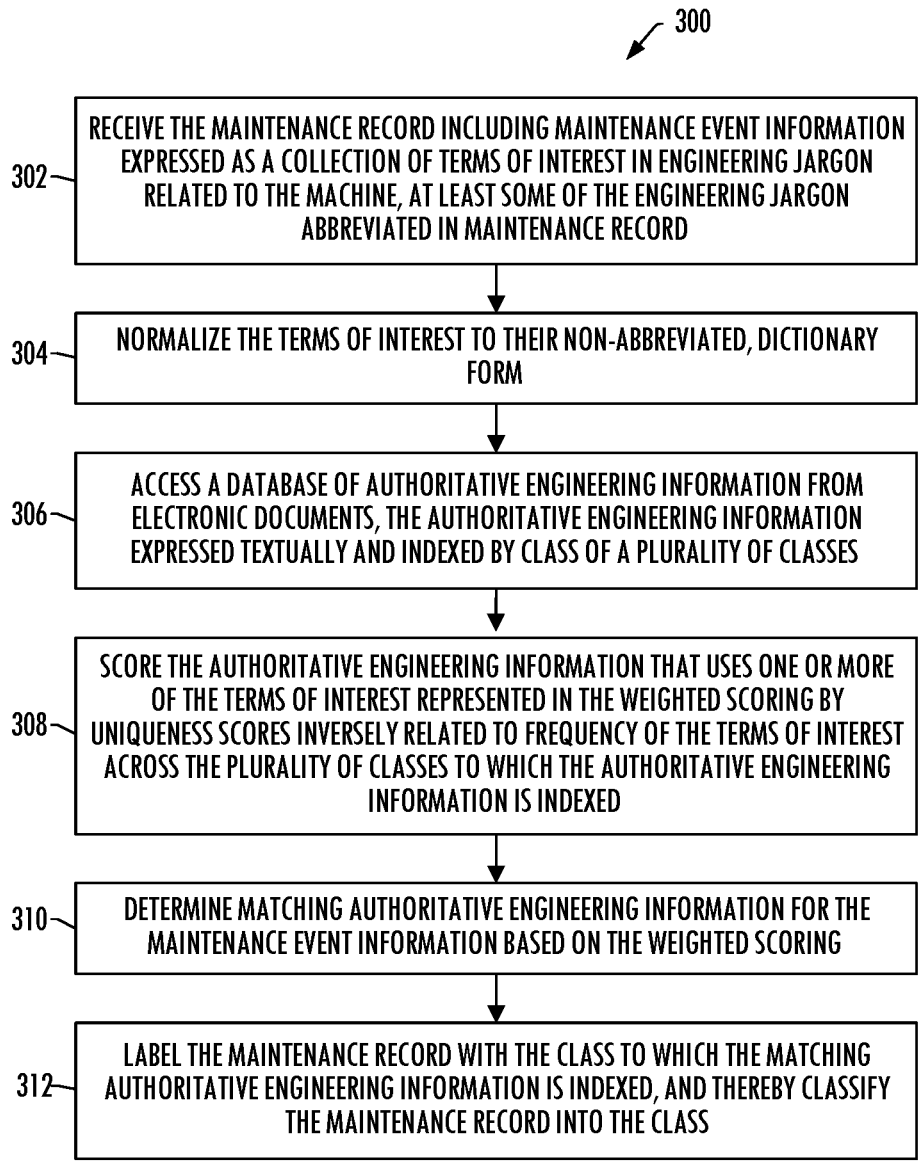
FIGS. 3A, 3B, 3C and 3D are flowcharts illustrating various steps in a method of classifying a maintenance record for a machine, according to various example implementations.
Figure 3B:
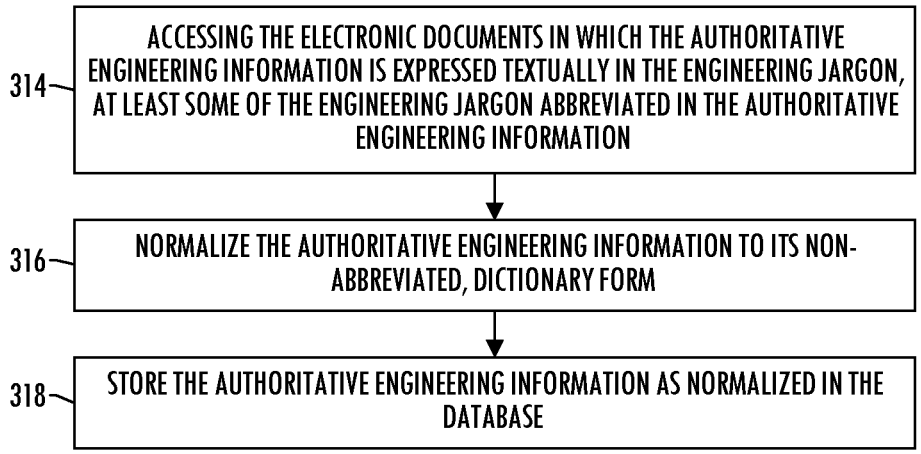

In some examples, the method 300 further includes accessing the electronic documents in which the authoritative engineering information is expressed textually in the engineering jargon, at least some of the engineering jargon abbreviated in the authoritative engineering information, as shown at block 314 of FIG. 3B. In some of these examples, the method includes normalizing the authoritative engineering information to its non-abbreviated, dictionary form, and storing the authoritative engineering information as normalized in the database, as shown at blocks 316 and 318.

Figure 3C:
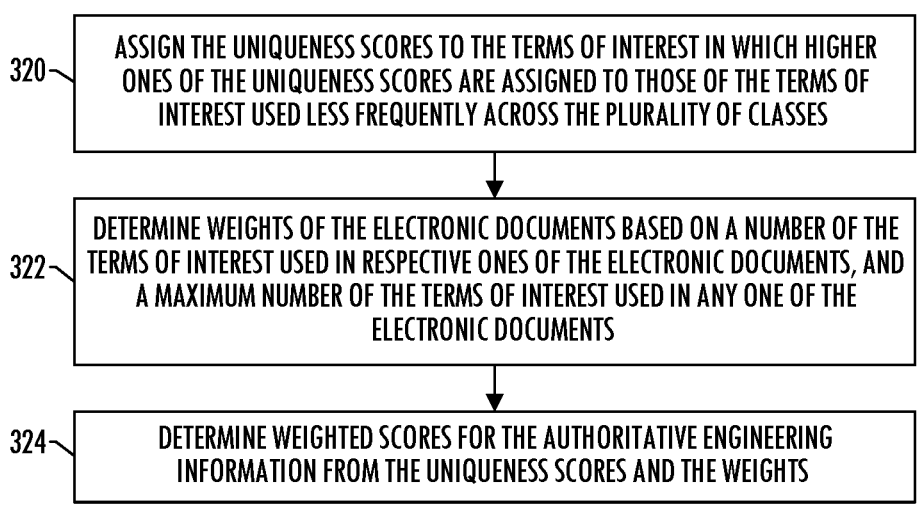
Figure 3D:
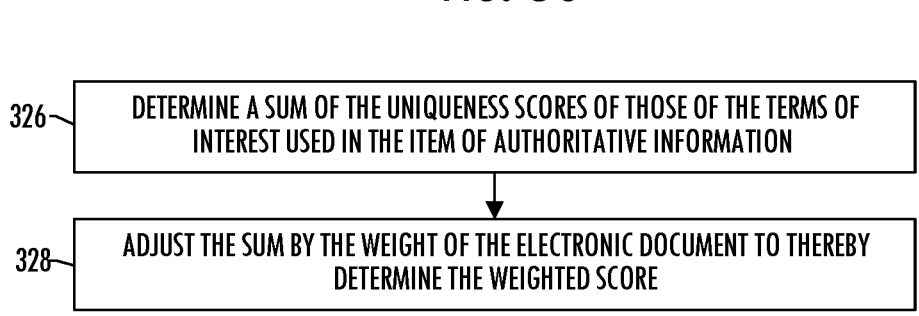

In some examples, weighted scoring the authoritative engineering information at block 308 includes assigning the uniqueness scores to the terms of interest in which higher ones of the uniqueness scores are assigned to those of the terms of interest used less frequently across the plurality of classes, as shown at block 320 of FIG. 3C. In some of these examples, weights of the electronic documents are determined based on a number of the terms of interest used in respective ones of the electronic documents, and a maximum number of the terms of interest used in any one of the electronic documents, as shown at block 322. Weighted scores for the authoritative engineering information, then, are determined from the uniqueness scores and the weights, as shown at block 324.

In some examples, the weights of the electronic documents are determined according to a non-linear growth function of the number of terms of interest used in respective ones of the electronic documents. In some of these examples, the maximum number of the terms of interest used in any one of the electronic documents.

In some examples, the weighted scores include a weighted score for each item of authoritative engineering information in each electronic document. In some of these examples, determining the weighted scores at block 324 includes determining a sum of the uniqueness scores of those of the terms of interest used in the item of authoritative engineering information, as shown at block 326 of FIG. 3D. The sum is then adjusted by the weight of the electronic document to thereby determine the weighted score, as shown at block 328.

In some examples, the method 300 is performed over a plurality of maintenance records including respective maintenance event information. In some of these examples, the plurality of maintenance records labeled with those of the plurality of classes to which respective matching authoritative engineering information is indexed.

In some examples, classes of the plurality of classes are numbers in a numbering system that is a common referencing standard for the electronic documents. In some of these examples, the authoritative engineering information is indexed by number of the numbers, and the maintenance record is labeled with the number to which the matching authoritative engineering information is indexed. And in some further examples, the machine is an aircraft, and the numbers are Air Transport Association (ATA) numbers in an ATA numbering system.

In some examples, the method 300 includes displaying one or more maintenance records 210. Additionally or alternatively, in some examples, the method includes storing a plurality of maintenance records as labeled in a database. The method can then further include executing a database query for features of the plurality of maintenance records from the database using the labels for data analytics performed thereon. In some examples, this includes a search of the database for those of the plurality of maintenance records that are classified in one or more classes of interest, which may be then used in administration of one or more programs.

According to example implementations of the subject disclosure, the system 200 and its subsystems can be implemented by various means. Means for implementing the system and its subsystems can include hardware, alone or under direction of one or more computer programs from a computer-readable storage medium. In some examples, one or more apparatuses can be configured to function as or otherwise implement the system and its subsystems shown and described herein. In examples involving more than one apparatus, the respective apparatuses can be connected to or otherwise in communication with one another in a number of different manners, such as directly or indirectly via a wired or wireless network or the like.

Figure 4:
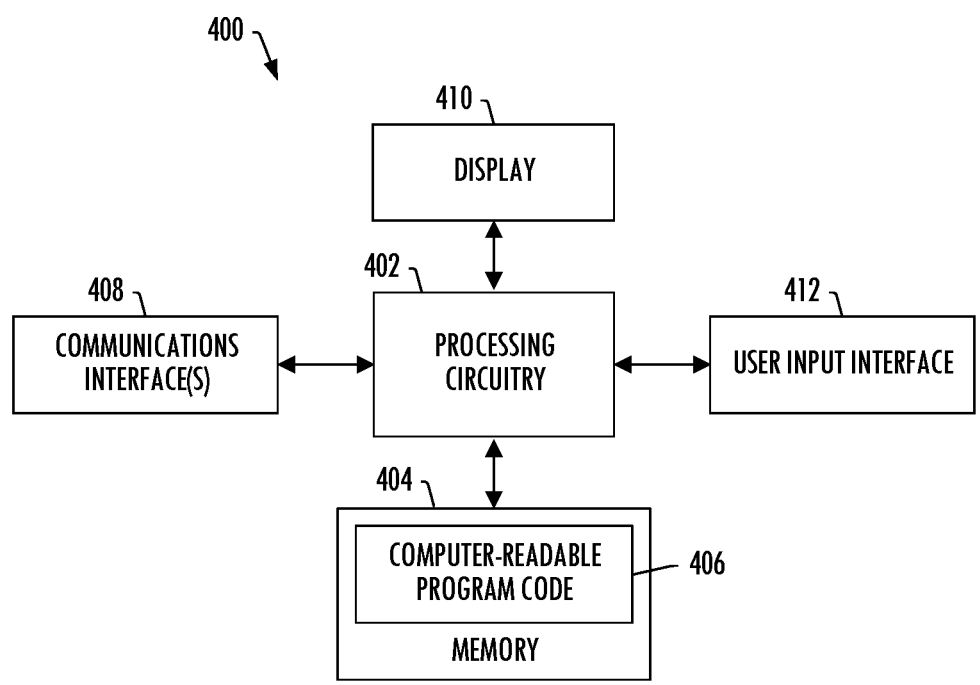
FIG. 4 illustrates an apparatus according to some example implementations.

FIG. 4 illustrates an apparatus 400 according to some example implementations of the subject disclosure. Generally, an apparatus of exemplary implementations of the subject disclosure can comprise, include or be embodied in one or more fixed or portable electronic devices. Examples of suitable electronic devices include a smartphone, tablet computer, laptop computer, desktop computer, workstation computer, server computer or the like. The apparatus can include one or more of each of a number of components such as, for example, processing circuitry 402 (e.g., processor unit) connected to a memory 404 (e.g., storage device).

The processing circuitry 402 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 404 (of the same or another apparatus).

The processing circuitry 402 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the subject disclosure.

The memory 404 is generally any piece of computer hardware that is capable of storing information such as, for example, data, computer programs (e.g., computer-readable program code 406) and/or other suitable information either on a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk-read only memory (CD-ROM), compact disk-read/write (CD-R/W), DVD or the like. In various instances, the memory can be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein can generally refer to a computer-readable storage medium or computer-readable transmission medium.

In addition to the memory 404, the processing circuitry 402 can also be connected to one or more interfaces for displaying, transmitting and/or receiving information. The interfaces can include a communications interface 408 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 410 and/or one or more user input interfaces 412 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 can include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, can be implemented by special purpose hardware-based computer systems and/or processing circuitry which perform the specified functions, or combinations of special purpose hardware and program code instructions.

As explained above and reiterated below, the subject disclosure includes, without limitation, the following example implementations.

Clause 1. An apparatus for classifying a maintenance record for a machine, the apparatus comprising: a memory configured to store computer-readable program code; and processing circuitry configured to access the memory, and execute the computer-readable program code to cause the apparatus to at least: receive the maintenance record including maintenance event information expressed as a collection of terms of interest in engineering jargon related to the machine, at least some of the engineering jargon abbreviated in maintenance record; normalize the terms of interest to their non-abbreviated, dictionary form; access a database of authoritative engineering information from electronic documents, the authoritative engineering information expressed textually and indexed by class of a plurality of classes; weighted score the authoritative engineering information that uses one or more of the terms of interest represented in the weighted scoring by uniqueness scores inversely related to frequency of the terms of interest across the plurality of classes to which the authoritative engineering information is indexed; determine matching authoritative engineering information for the maintenance event information based on the weighted scoring; and label the maintenance record with the class to which the matching authoritative engineering information is indexed, and thereby classify the maintenance record into the class.

Clause 2. The apparatus of clause 1, wherein the processing circuitry is configured to execute the computer-readable program code to cause the apparatus to further at least: access the electronic documents in which the authoritative engineering information is expressed textually in the engineering jargon, at least some of the engineering jargon abbreviated in the authoritative engineering information; normalize the authoritative engineering information to its non-abbreviated, dictionary form; and store the authoritative engineering information as normalized in the database.

Clause 3. The apparatus of clause 1 or clause 2, wherein the apparatus caused to weighted score the authoritative engineering information includes the apparatus caused to: assign the uniqueness scores to the terms of interest in which higher ones of the uniqueness scores are assigned to those of the terms of interest used less frequently across the plurality of classes; determine weights of the electronic documents based on a number of the terms of interest used in respective ones of the electronic documents, and a maximum number of the terms of interest used in any one of the electronic documents; and determine weighted scores for the authoritative engineering information from the uniqueness scores and the weights.

Clause 4. The apparatus of clause 3, wherein the weights of the electronic documents are determined according to a non-linear growth function of the number of terms of interest used in respective ones of the electronic documents, and the maximum number of the terms of interest used in any one of the electronic documents.

Clause 5. The apparatus of clause 3 or clause 4, wherein the weighted scores include a weighted score for each item of authoritative engineering information in each electronic document, and the apparatus caused to determine the weighted scores includes the apparatus caused to: determine a sum of the uniqueness scores of those of the terms of interest used in the item of authoritative engineering information; and adjust the sum by the weight of the electronic document to thereby determine the weighted score.

Clause 6. The apparatus of any of clauses 1 to 5, wherein the apparatus is caused to operate over a plurality of maintenance records including respective maintenance event information, the plurality of maintenance records labeled with those of the plurality of classes to which respective matching authoritative engineering information is indexed.

Clause 7. The apparatus of any of clauses 1 to 6, wherein classes of the plurality of classes are numbers in a numbering system that is a common referencing standard for the electronic documents, the authoritative engineering information is indexed by number of the numbers, and the maintenance record is labeled with the number to which the matching authoritative engineering information is indexed.

Clause 8. The apparatus of clause 7, wherein the machine is an aircraft, and the numbers are Air Transport Association (ATA) numbers in an ATA numbering system.

Clause 9. A method of classifying a maintenance record for a machine, the method comprising: receiving the maintenance record including maintenance event information expressed as a collection of terms of interest in engineering jargon related to the machine, at least some of the engineering jargon abbreviated in maintenance record; normalizing the terms of interest to their non-abbreviated, dictionary form; accessing a database of authoritative engineering information from electronic documents, the authoritative engineering information expressed textually and indexed by class of a plurality of classes; weighted scoring the authoritative engineering information that uses one or more of the terms of interest represented in the weighted scoring by uniqueness scores inversely related to frequency of the terms of interest across the plurality of classes to which the authoritative engineering information is indexed; determining matching authoritative engineering information for the maintenance event information based on the weighted scoring; and labeling the maintenance record with the class to which the matching authoritative engineering information is indexed, and thereby classifying the maintenance record into the class.

Clause 10. The method of clause 9 further comprising: accessing the electronic documents in which the authoritative engineering information is expressed textually in the engineering jargon, at least some of the engineering jargon abbreviated in the authoritative engineering information; normalizing the authoritative engineering information to its non-abbreviated, dictionary form; and storing the authoritative engineering information as normalized in the database.

Clause 11. The method of clause 9 or clause 10, wherein weighted scoring the authoritative engineering information comprises: assigning the uniqueness scores to the terms of interest in which higher ones of the uniqueness scores are assigned to those of the terms of interest used less frequently across the plurality of classes; determining weights of the electronic documents based on a number of the terms of interest used in respective ones of the electronic documents, and a maximum number of the terms of interest used in any one of the electronic documents; and determining weighted scores for the authoritative engineering information from the uniqueness scores and the weights.

Clause 12. The method of clause 11, wherein the weights of the electronic documents are determined according to a non-linear growth function of the number of terms of interest used in respective ones of the electronic documents, and the maximum number of the terms of interest used in any one of the electronic documents.

Clause 13. The method of clause 11 or clause 12, wherein the weighted scores include a weighted score for each item of authoritative engineering information in each electronic document, and determining the weighted scores comprises: determining a sum of the uniqueness scores of those of the terms of interest used in the item of authoritative engineering information; and adjusting the sum by the weight of the electronic document to thereby determine the weighted score.

Clause 14. The method of any of clauses 9 to 13, wherein the method is performed over a plurality of maintenance records including respective maintenance event information, the plurality of maintenance records labeled with those of the plurality of classes to which respective matching authoritative engineering information is indexed.

Clause 15. The method of any of clauses 9 to 14, wherein classes of the plurality of classes are numbers in a numbering system that is a common referencing standard for the electronic documents, the authoritative engineering information is indexed by number of the numbers, and the maintenance record is labeled with the number to which the matching authoritative engineering information is indexed.

Clause 16. The method of clause 15, wherein the machine is an aircraft, and the numbers are Air Transport Association (ATA) numbers in an ATA numbering system.

Clause 17. A computer-readable storage medium for classifying a maintenance record for a machine, the computer-readable storage medium being non-transitory and having computer-readable program code stored therein that, in response to execution by processing circuitry, causes an apparatus to at least: receive the maintenance record including maintenance event information expressed as a collection of terms of interest in engineering jargon related to the machine, at least some of the engineering jargon abbreviated in maintenance record; normalize the terms of interest to their non-abbreviated, dictionary form; access a database of authoritative engineering information from electronic documents, the authoritative engineering information expressed textually and indexed by class of a plurality of classes; weighted score the authoritative engineering information that uses one or more of the terms of interest represented in the weighted scoring by uniqueness scores inversely related to frequency of the terms of interest across the plurality of classes to which the authoritative engineering information is indexed; determine matching authoritative engineering information for the maintenance event information based on the weighted scoring; and label the maintenance record with the class to which the matching authoritative engineering information is indexed, and thereby classify the maintenance record into the class.

Clause 18. The computer-readable storage medium of clause 17, wherein the computer-readable storage medium has further computer-readable program code stored therein that, in response to execution by the processing circuitry, causes the apparatus to further at least: access the electronic documents in which the authoritative engineering information is expressed textually in the engineering jargon, at least some of the engineering jargon abbreviated in the authoritative engineering information; normalize the authoritative engineering information to its non-abbreviated, dictionary form; and store the authoritative engineering information as normalized in the database.

Clause 19. The computer-readable storage medium of clause 17 or clause 18, wherein the apparatus caused to weighted score the authoritative engineering information includes the apparatus caused to: assign the uniqueness scores to the terms of interest in which higher ones of the uniqueness scores are assigned to those of the terms of interest used less frequently across the plurality of classes; determine weights of the electronic documents based on a number of the terms of interest used in respective ones of the electronic documents, and a maximum number of the terms of interest used in any one of the electronic documents; and determine weighted scores for the authoritative engineering information from the uniqueness scores and the weights.

Clause 20. The computer-readable storage medium of clause 19, wherein the weights of the electronic documents are determined according to a non-linear growth function of the number of terms of interest used in respective ones of the electronic documents, and the maximum number of the terms of interest used in any one of the electronic documents.

Clause 21. The computer-readable storage medium of clause 19 or clause 20, wherein the weighted scores include a weighted score for each item of authoritative engineering information in each electronic document, and the apparatus caused to determine the weighted scores includes the apparatus caused to: determine a sum of the uniqueness scores of those of the terms of interest used in the item of authoritative engineering information; and adjust the sum by the weight of the electronic document to thereby determine the weighted score.

Clause 22. The computer-readable storage medium of any of clauses 17 to 21, wherein the apparatus is caused to operate over a plurality of maintenance records including respective maintenance event information, the plurality of maintenance records labeled with those of the plurality of classes to which respective matching authoritative engineering information is indexed.

Clause 23. The computer-readable storage medium of any of clauses 17 to 22, wherein classes of the plurality of classes are numbers in a numbering system that is a common referencing standard for the electronic documents, the authoritative engineering information is indexed by number of the numbers, and the maintenance record is labeled with the number to which the matching authoritative engineering information is indexed.

Clause 24. The computer-readable storage medium of clause 23, wherein the machine is an aircraft, and the numbers are Air Transport Association (ATA) numbers in an ATA numbering system.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions can be provided by alternative implementations without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. An apparatus for classifying a maintenance record for a machine, the apparatus comprising:
    a memory configured to store computer-readable program code; and
    processing circuitry configured to access the memory, and execute the computer-readable program code to cause the apparatus to at least:
    receive the maintenance record including maintenance event information expressed as a collection of terms of interest in engineering jargon related to the machine, at least some of the engineering jargon abbreviated in maintenance record;
    normalize the terms of interest to their non-abbreviated, dictionary form;
    access a database of authoritative engineering information from electronic documents, the authoritative engineering information expressed textually and indexed by class of a plurality of classes;
    weighted score the authoritative engineering information that uses one or more of the terms of interest represented in the weighted scoring by uniqueness scores inversely related to frequency of the terms of interest across the plurality of classes to which the authoritative engineering information is indexed;
    determine matching authoritative engineering information for the maintenance event information based on the weighted scoring; and
    label the maintenance record with the class to which the matching authoritative engineering information is indexed, and thereby classify the maintenance record into the class.

2. The apparatus of claim 1, wherein the processing circuitry is configured to execute the computer-readable program code to cause the apparatus to further at least:
    access the electronic documents in which the authoritative engineering information is expressed textually in the engineering jargon, at least some of the engineering jargon abbreviated in the authoritative engineering information;
    normalize the authoritative engineering information to its non-abbreviated, dictionary form; and
    store the authoritative engineering information as normalized in the database.

3. The apparatus of claim 1, wherein the apparatus caused to weighted score the authoritative engineering information includes the apparatus caused to:
    assign the uniqueness scores to the terms of interest in which higher ones of the uniqueness scores are assigned to those of the terms of interest used less frequently across the plurality of classes;
    determine weights of the electronic documents based on a number of the terms of interest used in respective ones of the electronic documents, and a maximum number of the terms of interest used in any one of the electronic documents; and
determine weighted scores for the authoritative engineering information from the uniqueness scores and the weights.

4. The apparatus of claim 3, wherein the weights of the electronic documents are determined according to a non-linear growth function of the number of terms of interest used in respective ones of the electronic documents, and the maximum number of the terms of interest used in any one of the electronic documents.

5. The apparatus of claim 3, wherein the weighted scores include a weighted score for each item of authoritative engineering information in each electronic document, and the apparatus caused to determine the weighted scores includes the apparatus caused to:
determine a sum of the uniqueness scores of those of the terms of interest used in the item of authoritative engineering information; and
adjust the sum by the weight of the electronic document to thereby determine the weighted score.

6. The apparatus of claim 1, wherein the apparatus is caused to operate over a plurality of maintenance records including respective maintenance event information, the plurality of maintenance records labeled with those of the plurality of classes to which respective matching authoritative engineering information is indexed.

7. The apparatus of claim 1, wherein classes of the plurality of classes are numbers in a numbering system that is a common referencing standard for the electronic documents, the authoritative engineering information is indexed by number of the numbers, and the maintenance record is labeled with the number to which the matching authoritative engineering information is indexed.

8. The apparatus of claim 7, wherein the machine is an aircraft, and the numbers are Air Transport Association (ATA) numbers in an ATA numbering system.

9. A method of classifying a maintenance record for a machine, the method comprising:
receiving the maintenance record including maintenance event information expressed as a collection of terms of interest in engineering jargon related to the machine, at least some of the engineering jargon abbreviated in maintenance record;
normalizing the terms of interest to their non-abbreviated, dictionary form;
accessing a database of authoritative engineering information from electronic documents, the authoritative engineering information expressed textually and indexed by class of a plurality of classes;
weighted scoring the authoritative engineering information that uses one or more of the terms of interest represented in the weighted scoring by uniqueness scores inversely related to frequency of the terms of interest across the plurality of classes to which the authoritative engineering information is indexed;
determining matching authoritative engineering information for the maintenance event information based on the weighted scoring; and
labeling the maintenance record with the class to which the matching authoritative engineering information is indexed, and thereby classifying the maintenance record into the class.

10. The method of claim 9 further comprising:
accessing the electronic documents in which the authoritative engineering information is expressed textually in the engineering jargon, at least some of the engineering jargon abbreviated in the authoritative engineering information;
normalizing the authoritative engineering information to its non-abbreviated, dictionary form; and
storing the authoritative engineering information as normalized in the database.

11. The method of claim 9, wherein weighted scoring the authoritative engineering information comprises:
assigning the uniqueness scores to the terms of interest in which higher ones of the uniqueness scores are assigned to those of the terms of interest used less frequently across the plurality of classes;
determining weights of the electronic documents based on a number of the terms of interest used in respective ones of the electronic documents, and a maximum number of the terms of interest used in any one of the electronic documents; and
determining weighted scores for the authoritative engineering information from the uniqueness scores and the weights.

12. The method of claim 11, wherein the weights of the electronic documents are determined according to a non-linear growth function of the number of terms of interest used in respective ones of the electronic documents, and the maximum number of the terms of interest used in any one of the electronic documents.

13. The method of claim 11, wherein the weighted scores include a weighted score for each item of authoritative engineering information in each electronic document, and determining the weighted scores comprises:
determining a sum of the uniqueness scores of those of the terms of interest used in the item of authoritative engineering information; and
adjusting the sum by the weight of the electronic document to thereby determine the weighted score.

14. The method of claim 9, wherein the method is performed over a plurality of maintenance records including respective maintenance event information, the plurality of maintenance records labeled with those of the plurality of classes to which respective matching authoritative engineering information is indexed.

15. The method of claim 9, wherein classes of the plurality of classes are numbers in a numbering system that is a common referencing standard for the electronic documents, the authoritative engineering information is indexed by number of the numbers, and the maintenance record is labeled with the number to which the matching authoritative engineering information is indexed.

16. The method of claim 15, wherein the machine is an aircraft, and the numbers are Air Transport Association (ATA) numbers in an ATA numbering system.

17. A computer-readable storage medium for classifying a maintenance record for a machine, the computer-readable storage medium being non-transitory and having computer-readable program code stored therein that, in response to execution by processing circuitry, causes an apparatus to at least:
receive the maintenance record including maintenance event information expressed as a collection of terms of interest in engineering jargon related to the machine, at least some of the engineering jargon abbreviated in maintenance record;
normalize the terms of interest to their non-abbreviated, dictionary form;
access a database of authoritative engineering information from electronic documents, the authoritative engineering information expressed textually and indexed by class of a plurality of classes;

weighted score the authoritative engineering information that uses one or more of the terms of interest represented in the weighted scoring by uniqueness scores inversely related to frequency of the terms of interest across the plurality of classes to which the authoritative engineering information is indexed;

determine matching authoritative engineering information for the maintenance event information based on the weighted scoring; and label the maintenance record with the class to which the matching authoritative engineering information is indexed, and thereby classify the maintenance record into the class.

18. The computer-readable storage medium of claim 17, wherein the computer-readable storage medium has further computer-readable program code stored therein that, in response to execution by the processing circuitry, causes the apparatus to further at least:

access the electronic documents in which the authoritative engineering information is expressed textually in the engineering jargon, at least some of the engineering jargon abbreviated in the authoritative engineering information;

normalize the authoritative engineering information to its non-abbreviated, dictionary form; and store the authoritative engineering information as normalized in the database.

19. The computer-readable storage medium of claim 17, wherein the apparatus caused to weighted score the authoritative engineering information includes the apparatus caused to:

assign the uniqueness scores to the terms of interest in which higher ones of the uniqueness scores are assigned to those of the terms of interest used less frequently across the plurality of classes;

determine weights of the electronic documents based on a number of the terms of interest used in respective ones of the electronic documents, and a maximum number of the terms of interest used in any one of the electronic documents; and determine weighted scores for the authoritative engineering information from the uniqueness scores and the weights.

20. The computer-readable storage medium of claim 19, wherein the weights of the electronic documents are determined according to a non-linear growth function of the number of terms of interest used in respective ones of the electronic documents, and the maximum number of the terms of interest used in any one of the electronic documents.

* * * * *